(12) United States Patent
Fischer

(10) Patent No.: US 8,925,380 B2
(45) Date of Patent: Jan. 6, 2015

(54) METHOD AND APPARATUS FOR DETERMINING QUALITY OF A GEARING SYSTEM

(75) Inventor: Mario Fischer, Saalfelder Höhe (DE)

(73) Assignee: TRIMBLE Jena GmbH, Jena (DE)

( * ) Notice: Subject to any disclaimer, the term of this patent is extended or adjusted under 35 U.S.C. 154(b) by 287 days.

(21) Appl. No.: 13/494,833

(22) Filed: Jun. 12, 2012

(65) Prior Publication Data

US 2013/0019674 A1  Jan. 24, 2013

(30) Foreign Application Priority Data

Jul. 19, 2011 (DE) .......................... 10 2011 079384

(51) Int. Cl.
*G01M 13/02* (2006.01)

(52) U.S. Cl.
CPC ................................ *G01M 13/021* (2013.01)
USPC .......................................................... 73/162

(58) Field of Classification Search
CPC .......................... G01M 13/021; G01M 13/02
USPC .............................................................. 73/162
See application file for complete search history.

(56) References Cited

U.S. PATENT DOCUMENTS

| | | | | |
|---|---|---|---|---|
| 2,582,408 | A | * | 1/1952 | Bauer ............................ 451/114 |
| 2,613,050 | A | | 10/1952 | Esval |
| 3,405,557 | A | * | 10/1968 | Sinke, Jr. ......................... 73/162 |
| 3,580,068 | A | * | 5/1971 | Hoodwin ......................... 73/162 |
| 3,774,313 | A | * | 11/1973 | Occhialini et al. .......... 33/501.19 |
| 3,816,712 | A | | 6/1974 | Herzog |
| 4,093,383 | A | | 6/1978 | Fiest et al. |
| 4,182,045 | A | * | 1/1980 | Bosch et al. .................. 33/501.9 |
| 4,322,889 | A | * | 4/1982 | Guenter ........................ 33/501.9 |
| 4,336,711 | A | * | 6/1982 | Maehara et al. ................. 73/162 |
| 4,351,187 | A | | 9/1982 | Foulks et al. |
| 4,488,359 | A | | 12/1984 | Misson |
| 4,498,335 | A | * | 2/1985 | Thoma ............................ 73/162 |
| 4,499,760 | A | | 2/1985 | Fischer et al. |
| 4,586,373 | A | * | 5/1986 | Muller et al. .................... 73/162 |
| 4,704,799 | A | | 11/1987 | Kobetsky |
| 4,831,872 | A | * | 5/1989 | Huang et al. .................... 73/162 |
| 4,852,402 | A | * | 8/1989 | Bertz .............................. 73/162 |
| 4,872,337 | A | * | 10/1989 | Watts et al. ..................... 73/162 |
| 5,113,704 | A | * | 5/1992 | Yano et al. ...................... 73/162 |
| 5,219,389 | A | * | 6/1993 | Gutman ......................... 73/162 |

(Continued)

FOREIGN PATENT DOCUMENTS

| | | |
|---|---|---|
| CN | 101271038 | 9/2008 |
| DE | 635 645 A | 9/1936 |

(Continued)

*Primary Examiner* — David A Rogers
(74) *Attorney, Agent, or Firm* — Kilpatrick Townsend & Stockton LLP

(57) ABSTRACT

A method and an apparatus for determining the quality of a gearing system is described. The method includes the steps of setting a sequence of target angles of rotation of a first gear wheel, measuring for each of the target angles of rotation an output angle of rotation of a second gear wheel, and calculating a plurality of theoretical output angles of rotation. The method also includes obtaining angle of rotation differences between the plurality of output angles of rotation and the plurality of theoretical output angles of rotation, forming a sequence of cumulative values, and determining, based on the sequence, a first amplitude value, a second amplitude value or a third amplitude value.

20 Claims, 12 Drawing Sheets

(56) References Cited

U.S. PATENT DOCUMENTS

| | | | |
|---|---|---|---|
| 5,307,676 A * | 5/1994 | Gutman | 73/162 |
| 5,331,490 A | 7/1994 | Richards et al. | |
| 5,392,644 A * | 2/1995 | Frazier | 73/162 |
| 5,421,096 A | 6/1995 | Ross | |
| 5,475,930 A | 12/1995 | Kimura | |
| 5,485,266 A | 1/1996 | Hirano et al. | |
| 5,511,414 A * | 4/1996 | Nakamura et al. | 73/162 |
| 5,609,058 A * | 3/1997 | Gnadt et al. | 73/162 |
| 5,636,018 A | 6/1997 | Hirano et al. | |
| 5,642,297 A | 6/1997 | Brady et al. | |
| 5,784,155 A | 7/1998 | Ohtomo et al. | |
| 5,898,490 A | 4/1999 | Ohtomo et al. | |
| 5,946,087 A | 8/1999 | Kasori et al. | |
| 5,987,763 A | 11/1999 | Ammann et al. | |
| 6,046,557 A | 4/2000 | Godo | |
| 6,075,586 A | 6/2000 | Ohtomo et al. | |
| 6,076,266 A | 6/2000 | Beckingham et al. | |
| 6,255,645 B1 * | 7/2001 | Gardner et al. | 250/231.13 |
| 6,507,789 B1 * | 1/2003 | Reddy et al. | 702/34 |
| 6,604,293 B2 | 8/2003 | Hamada | |
| 6,655,205 B2 * | 12/2003 | Bartelt et al. | 73/162 |
| 6,688,011 B2 | 2/2004 | Gamal et al. | |
| 6,871,408 B2 | 3/2005 | Malard et al. | |
| 7,013,744 B2 * | 3/2006 | Wirz | 73/866.5 |
| 7,059,058 B2 | 6/2006 | Kousek et al. | |
| 7,117,609 B2 * | 10/2006 | Mies et al. | 33/501.9 |
| 7,607,236 B1 * | 10/2009 | Patrick et al. | 33/501.19 |
| 7,634,381 B2 | 12/2009 | Westermark et al. | |
| 7,707,879 B2 * | 5/2010 | Tobisawa et al. | 73/162 |
| 7,716,844 B2 * | 5/2010 | Pommer | 33/501.19 |
| 7,784,345 B2 * | 8/2010 | Landvogt et al. | 73/587 |
| 7,912,659 B2 * | 3/2011 | Luo | 702/56 |
| 8,544,331 B2 * | 10/2013 | Liang et al. | 73/660 |
| 2003/0229997 A1 | 12/2003 | Gamal et al. | |
| 2006/0254055 A1 * | 11/2006 | Sabourin | 29/893.1 |
| 2008/0297760 A1 | 12/2008 | Herbst et al. | |
| 2009/0133273 A1 | 5/2009 | Westermark et al. | |
| 2010/0180456 A1 | 7/2010 | Laabs et al. | |

FOREIGN PATENT DOCUMENTS

| | | |
|---|---|---|
| DE | 679 911 A | 8/1939 |
| DE | 919 331 A | 10/1954 |
| DE | 758 308 A | 8/1956 |
| DE | 1 202013 | 9/1965 |
| DE | 2159002 C3 | 6/1973 |
| DE | 126966 A1 | 8/1977 |
| DE | 3732444 C2 | 4/1988 |
| DE | 4011724 C2 | 10/1991 |
| DE | 295 03 919 U1 | 4/1995 |
| DE | 19719249 C1 | 9/1998 |
| DE | 102009000350 B3 | 8/2010 |
| EP | 0 304 262 B1 | 2/1989 |
| EP | 0312633 | 4/1989 |
| EP | 0 388 898 A1 | 9/1990 |
| EP | 0325688 B1 | 4/1993 |
| EP | 0510431 B1 | 12/1994 |
| EP | 1241462 B1 | 9/2002 |
| EP | 0 989 385 B1 | 6/2006 |
| EP | 1862789 B1 | 12/2007 |
| JP | 01-165929 | 6/1989 |
| JP | 2002-310657 A | 10/2002 |
| JP | 2007-003507 | 1/2007 |
| JP | 2007-10493 | 1/2007 |
| JP | 2007-016971 A | 1/2007 |
| JP | 2008-224527 A | 9/2008 |
| WO | 2004/008263 | 1/2004 |
| WO | WO2004034010 A1 | 4/2004 |
| WO | 2004/097338 A | 11/2004 |
| WO | WO2010134884 | 11/2010 |

* cited by examiner

METHOD AND APPARATUS FOR DETERMINING QUALITY OF A GEARING SYSTEM

BACKGROUND OF THE INVENTION

The present invention relates to a method and an apparatus for determining quality of a gearing system having at least two gear wheels, and in particular a method and an apparatus which, by using angle of rotation differences between a plurality of measured output angles of rotation and theoretical output angles of rotation of a second gear wheel, can obtain a quality measure of the gearing system.

Many precision instruments include gearing mechanisms, and in particular toothed wheels which form these gearing mechanisms. The mechanisms often implement rotation or other movement of a part of the instrument, e.g. a head part or arm. For example, simple microscopes contain gearing mechanisms realized by toothed wheels which enable minimal changes in the distance between the objective and the object table by rotating an adjustment wheel. To generate a consistent movement it is important for the toothed wheels to be shifted with minimal play, their individual teeth being engaged with one another. Optimal operation is best achieved by there being an optimal distance between the toothed wheels, and by the toothed wheels being uniform.

In measuring technology, e.g. surveying technology, gearing mechanisms in measuring instruments, in particular surveying instruments, such as e.g. tachymeters, theodolites or total stations also play a large role. Such instruments are used for measuring distances and/or angles of objects. These measuring instruments usually have a base unit with a stand for the stable positioning of the measuring instrument on the ground, and a head unit which can be moved in relation to the base unit. The head generally includes an optical device, such as a distance measuring device or a targeting apparatus for targeting or focusing on an object, for example, a lens, a telescope, a camera or similar item. In particular, to be positioned so that it can target an object, the head unit must be rotatable within the space, preferably in a vertical and a horizontal direction, which can be achieved by an appropriate gearing mechanism.

The moveable or rotatable head unit can provide a distance measuring device or a targeting apparatus for targeting a distant object to determine the location of the distant object. Different types of gearing mechanism or drives are known for rotating the head unit relative to the base unit in a horizontal plane. It is possible, for example, to provide the distance measuring device of the head on a gimbal-mount bracket so as to also be moveable in a vertical direction.

In surveying instruments, such as e.g. geodetic measuring instruments, the rotation of the head unit can be brought about by using a motor, for example, a direct current drive motor, so that the head unit can be accurately moved relative to the base unit. When setting a specific angle it is important here to provide a high degree of accuracy, preferably being below 1". Such accuracy leads to quality requirements being made of the gearing mechanism which rotates the head unit.

The double flank gear test is a known test for toothed wheels of a gearing mechanism. The double flank gear test is used for simply testing gear teeth, i.e. the points or spikes of toothed wheels or similar geared wheels. The principle of the double flank gear test is based upon a master toothed wheel, which is highly precise, and a toothed test wheel, which represents the workpiece, being shifted toward one another without play. A corresponding test apparatus is designed such that one axis of rotation is fixed and the other axis of rotation of the other toothed wheel is variable. With efficient dimensional and form stability of the toothed wheels, the axis distance remains constant during shifting. Deviations from the ideal form of a toothed wheel lead to fluctuations in the axis difference between the two toothed wheels.

Although the double flank gear test is an established test method, it can only be applied to gearing mechanisms under certain conditions. The examination of the gearing mechanism of a measuring instrument or some other precision instrument, such as a microscope, would require the testing of the individual toothed wheels of the gearing mechanism in a double flank gear test. The quality of the individual toothed wheels thus could be tested, but the interplay of the toothed wheels of the gearing mechanism, in particular the distance between the latter, cannot be examined. In addition, automatic matching of the distance between the toothed wheels of a gearing mechanism is also not possible either.

Consequently, there is a need to provide a method and an apparatus for determining quality of a gearing system having at least two gear wheels which enables matching of the toothed wheels of the gearing system and determination of the quality of the gearing system.

BRIEF SUMMARY OF THE INVENTION

A method and an apparatus which resolve at least one or more of the aforementioned problems are defined in the independent claims. Advantageous embodiments are described in the dependent claims.

According to one embodiment a method for determining quality of a gearing system having at least two gear wheels includes setting within a measuring interval a sequence of target angles of rotation of a first gear wheel, and measuring for each of the target angles of rotation an output angle of rotation of a second gear wheel. The method further includes calculation of a plurality of theoretical output angles of rotation upon the basis of the plurality of target angles of rotation using at least one transmission ratio of the first gear wheel and the second gear wheel, and obtaining angle of rotation differences between the plurality of output angles of rotation and the plurality of theoretical output angles of rotation. It then forms a sequence of cumulative values which are associated with the angle of rotation differences, and a cumulative value which is associated with a present angle of rotation difference. The result provides a total of angle of rotation differences which precede the present angle of rotation difference within the measuring interval.

Accordingly, the method includes determining, based on the sequence of cumulative values, at least one of a first amplitude value, a second amplitude value and a third amplitude value. The first amplitude value of a first frequency component is produced by a rotation of the first gear wheel within the measuring interval. The second amplitude value of a second frequency component is produced by a rotation of the second gear wheel within the measuring interval. The third amplitude value of a third frequency component is produced by the number of gear wheel tooth engagements between the gear wheel teeth of the first gear wheel and of the second gear wheel within the measuring interval. The at least one amplitude value, which is associated with the first, second or third frequency component, provides a quality measure of the gearing system. Thus, a simple method is provided that makes it possible to determine the quality measure of the gearing system so that, for example, an optimal distance between gear wheels can be chosen or a gearing mechanism or individual gear wheel can be replaced if it does not fulfill specific quality requirements.

In another embodiment of the invention the method further includes implementing a frequency analysis for determining the at least one amplitude value of the first, second or third frequency component. A simple analysis can thus be provided which can also be implemented easily in an automated system.

In another embodiment of the invention the frequency analysis includes transforming the sequence of cumulative values into the frequency range or graphic analysis of the sequence of cumulative values within the time range for determining at least one of the frequency components and the corresponding amplitude value of the latter. Accordingly, depending on the implementation different analyses can be used.

In another embodiment of the invention the method includes transforming the determined first frequency component into the time range for obtaining a first accumulated angle of rotation error which is generated by the first gear wheel, and/or transforming the determined second frequency component into the time range for obtaining a second accumulated angle of rotation error which is generated by the second gear wheel. Accordingly, a measure for the quality of one or both gear wheels can be obtained by the first and/or second accumulated angle of rotation error.

In another embodiment of the invention the method further includes the steps of forming a derivation for the first gear wheel from the first accumulated angle of rotation error, and forming a derivation for the second gear wheel from the second accumulated angle of rotation error. Accordingly, step angle errors can be determined which in particular specify the error per measurement step.

In another embodiment of the invention the method further includes obtaining a first radius variation of the first gear wheel upon the basis of a minimum of the derivation for the first gear wheel and a maximum of the derivation for the first gear wheel, and/or obtaining a second radius variation of the second gear wheel upon the basis of a minimum of the derivation for the second gear wheel and a maximum of the derivation for the second gear wheel. Accordingly, the first and/or second radius variation of the first or second gear wheel can be obtained by a simple calculation with the minimal and maximal value of the derivation.

In another embodiment of the invention the method further includes determining harmonics of the third frequency component, and obtaining amplitude values of the harmonics of the second frequency component as a quality measure of the gear wheel arrangement. Accordingly the harmonics of the third frequency component, in particular the amplitude values of the latter, can be obtained as a quality measure of the gearing system, and this leads to a better estimation of the effect of the teeth upon the quality of the gearing system and can be used for adapting the distance between the axes of rotation of the gear wheels.

In another embodiment of the invention the method includes minimizing the amplitude value of at least one of the amplitude value of the third frequency component and the amplitude value of the harmonics of the third frequency component by varying the distance between the first axis of rotation and the second axis of rotation. Accordingly, by measuring the amplitude value or the amplitude values, an optimal distance between the axes of rotation can easily be found, and this leads to a gearing system with a high quality measure.

In another embodiment of the invention the measuring interval includes at least one rotation of the one gear wheel of the gear wheels the circumference of which is greater. It can thus be ensured that a sufficiently large measuring interval with corresponding measuring points for an analysis of the quality measure of the gearing system is provided.

In another embodiment of the invention the method includes in addition to determination of the amplitude values determination of a phase of the frequency component in the frequency range, the phase being connected to the one gear wheel of the gear wheels the circumference of which is greater, and setting the measuring interval upon the basis of the determined phase. It can thus be established when a start and an end of a measuring interval is reached so that a conclusion can be reached regarding the quality measure of the gearing system upon the basis of the amplitude values.

In another embodiment the method includes obtaining amplitude values of the third frequency component for different distance values between the first axis of rotation of the first gear wheel and the second axis of rotation of the second gear wheel and iterative changing of the distance values for minimizing the third frequency component, in particular minimizing the amplitude of the latter. It is thus possible by minimizing the third frequency component to find an optimal distance between the two axes of rotation of the gear wheels with which there is an optimal gearing system with a high quality measure.

In another embodiment of the invention the method further includes correcting an angle error of the second gear wheel using a cumulative value of the sequence of cumulative values which is connected to a target angle of rotation of the first gear wheel. Accordingly, an angle error of the second gear wheel can be corrected so that the actual angle position of the second gear wheel, which can deviate from an output angle of rotation, can be determined.

According to another embodiment of the invention an apparatus for determining a quality of a gearing system comprising at least two gear wheels is provided. The apparatus comprises means for setting within a measuring interval a sequence of target angles of rotation of a first gear wheel, means for measuring for each of the target angles of rotation an output angle of rotation of a second gear wheel, means for calculating a plurality of theoretical output angles of rotation upon the basis of the plurality of target angles of rotation using at least one transmission ratio of the first gear wheel and of the second gear wheel, means for obtaining angle of rotation differences between the plurality of output angles of rotation and the plurality of theoretical output angles of rotation, means for forming a sequence of cumulative values which are associated with the angle of rotation differences, a cumulative value, which is associated with a current angle of rotation difference, including a total of angle of rotation differences which precede the present angle of rotation difference within the measuring interval, and means for determining, upon the basis of the sequence of cumulative values, at least one first amplitude value of a first frequency component which is produced by a rotation of the first gear wheel within the measuring interval; a second amplitude value of a second frequency component which is produced by a rotation of the second gear wheel within the measuring interval; and a third amplitude value of a third frequency component which is produced by a number of gear wheel tooth engagements between the gear wheel teeth of the first gear wheel and the second gear wheel within the measuring interval; the at least one amplitude value, which is associated with the first, second or third frequency component, constituting a quality measure of the gear wheel arrangement. Accordingly, an apparatus is provided which makes it possible to determine a quality measure of the gearing system of at least two gear wheels so that, for example, an optimal distance between gear wheels can be chosen or a gearing mechanism or individual gear wheel can be eliminated if it does not fulfill specific quality requirements.

According to a further embodiment of the invention a system is provided which includes the apparatus described above and a measuring instrument that includes the gearing system. In this way the gear wheel system, and in particular the axis distances between gear wheels, can be set optimally.

According to a further embodiment of the invention a program for a data processing device for implementing the methods described above is provided, as well as a computer-readable medium in which the program is embodied, the program in a computer causing the steps with the above features to be implemented. According to a further embodiment a computer program product is provided that contains the program described above.

Further advantageous features of the invention are disclosed in the claims.

DETAILED DESCRIPTION OF THE INVENTION

Preferred embodiments are described with reference to the figures. It is noted that the following description provides an exemplary embodiment, which should not be interpreted as restricting the invention.

Embodiments generally relate to a method and an apparatus for determining a quality of a gearing system comprising at least two gear wheels. In one embodiment a sequence of target angles of rotation of a first gear wheel is set, and for each of these target angles of rotation output angles of rotation of a second gear wheel are measured. After this, using the transmission ratio of the gearing system, the theoretical output angles of rotation are calculated so that angle of rotation differences between the measured and theoretically calculated output angles of rotation are obtained. By adding up the angle of rotation differences, for each measuring point a cumulative value can be formed from the angle of rotation differences obtained up to this measuring point. The sequence of cumulative values enables determination of different amplitude values of frequency components of the gear wheels and gear wheel tooth engagements, which constitute a quality measure of the gearing system.

Figure 1:
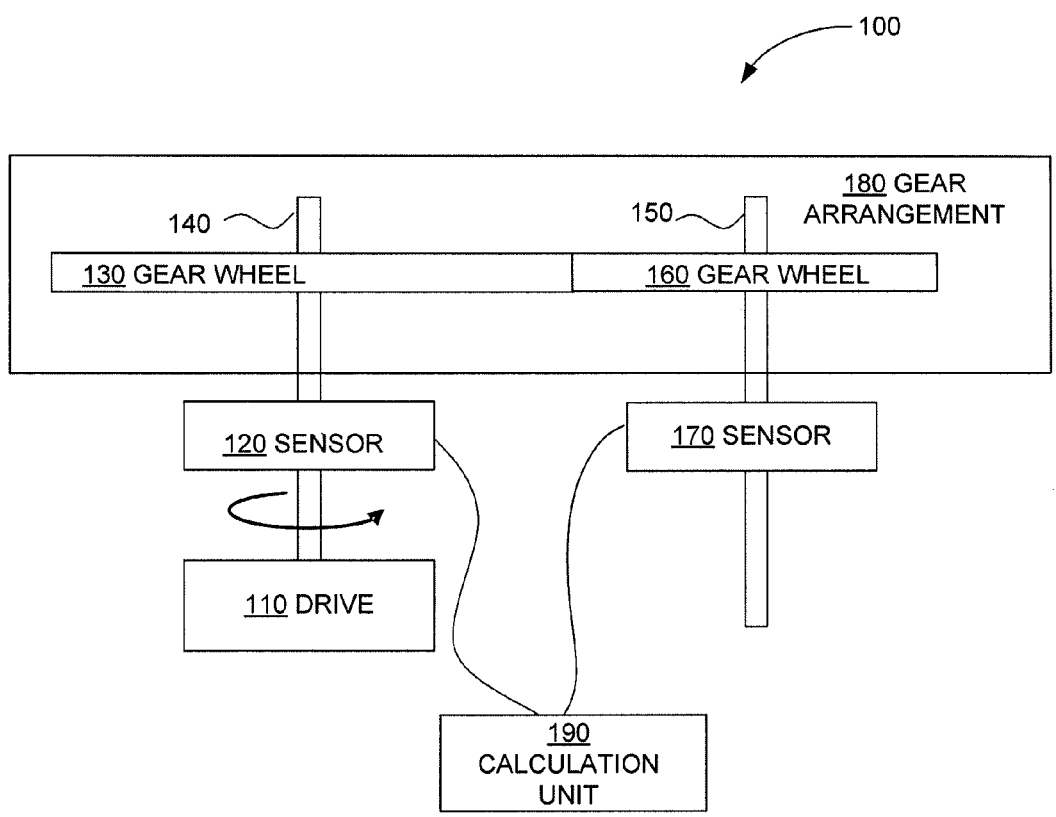
FIG. 1 illustrates a system with elements which are arranged for testing a gearing system.

FIG. 1 shows elements of a system 100. The system 100 includes a drive 110, a sensor 120, a sensor 170, a calculation unit 190 and a gearing system 180 such as a gear wheel arrangement. The gearing system 180 includes a first gear wheel 130 and a corresponding axis of rotation 140 as well as a second gear wheel 160 and a corresponding axis of rotation 150. The drive 110 and the sensor 120 can also be replaced by a stepper motor that performs both functions.

When the drive 110 rotates the axis of rotation 140 of the first gear wheel 130, a sensor or angle encoder measures the angle of the rotation. By rotating the axis of rotation 140 the gear wheel 130 fastened to the axis of rotation is also rotated, gear wheel 130 being coupled to the gear wheel 160. Typically the gear wheels are toothed wheels which are engaged with one another. Of course the two gear wheels could also be connected to one another by a chain or a belt, and so the gear wheels are not restricted to toothed wheels. The rotation of the gear wheel 160 can be measured by the sensor 170 because the axis of rotation 150 is connected to the gear wheel 160. By comparing the angle of rotation of the sensor 120 with the angles of rotation of the sensor 170 one can draw conclusions regarding the quality of the gearing system. This is described in more detail below.

Figure 2:
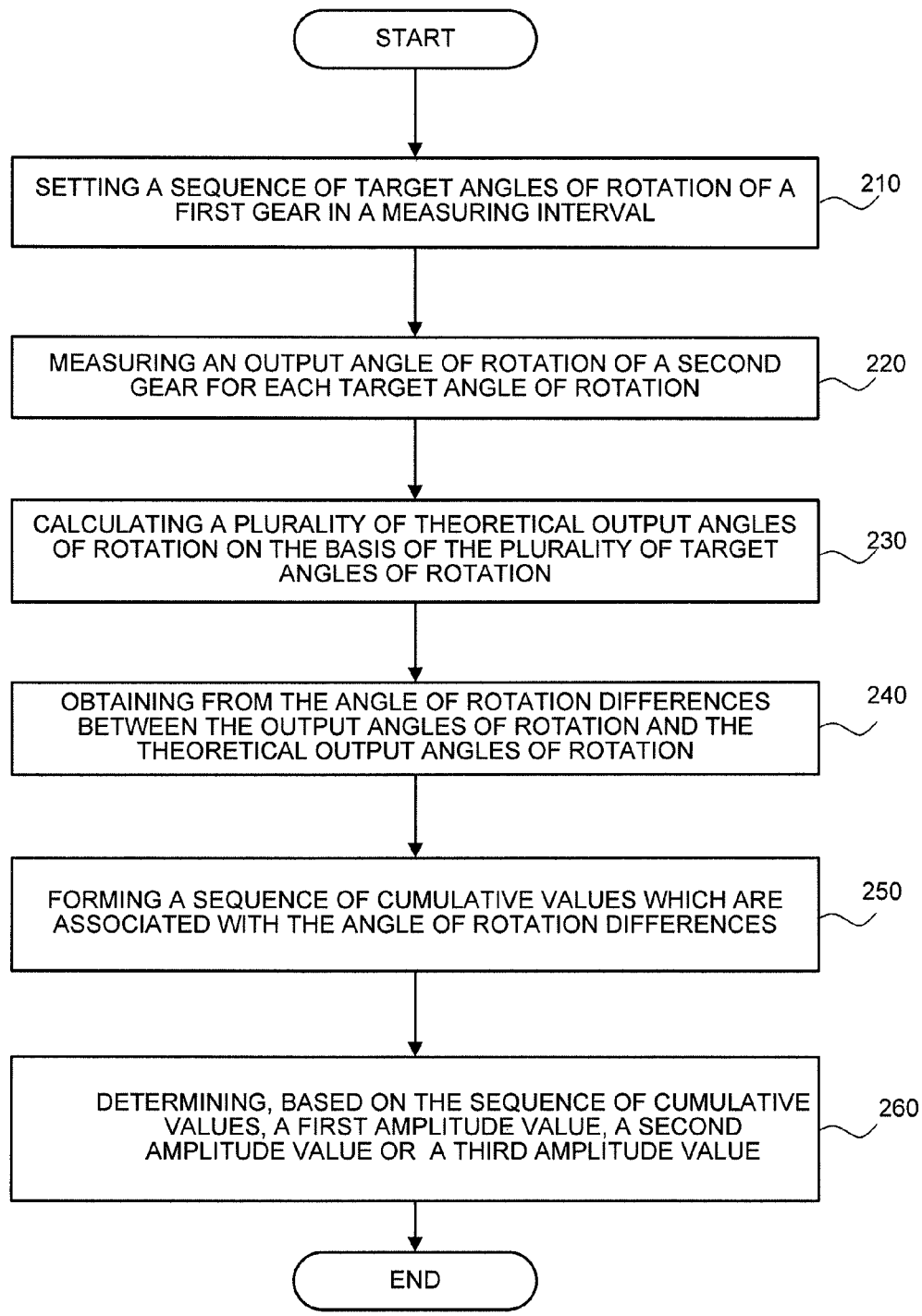
FIG. 2 illustrates steps of a method for determining a quality of a gearing system according to an embodiment of the invention.

FIG. 2 shows steps of a method for determining a quality of a gearing system, such as e.g. the gearing system 180 comprising the two gear wheels 130 and 160. To simplify the description it is assumed that, as shown in FIG. 1, the gearing system includes two gear wheels which constitute toothed wheels, the teeth of which engage with one another.

Figure 3:
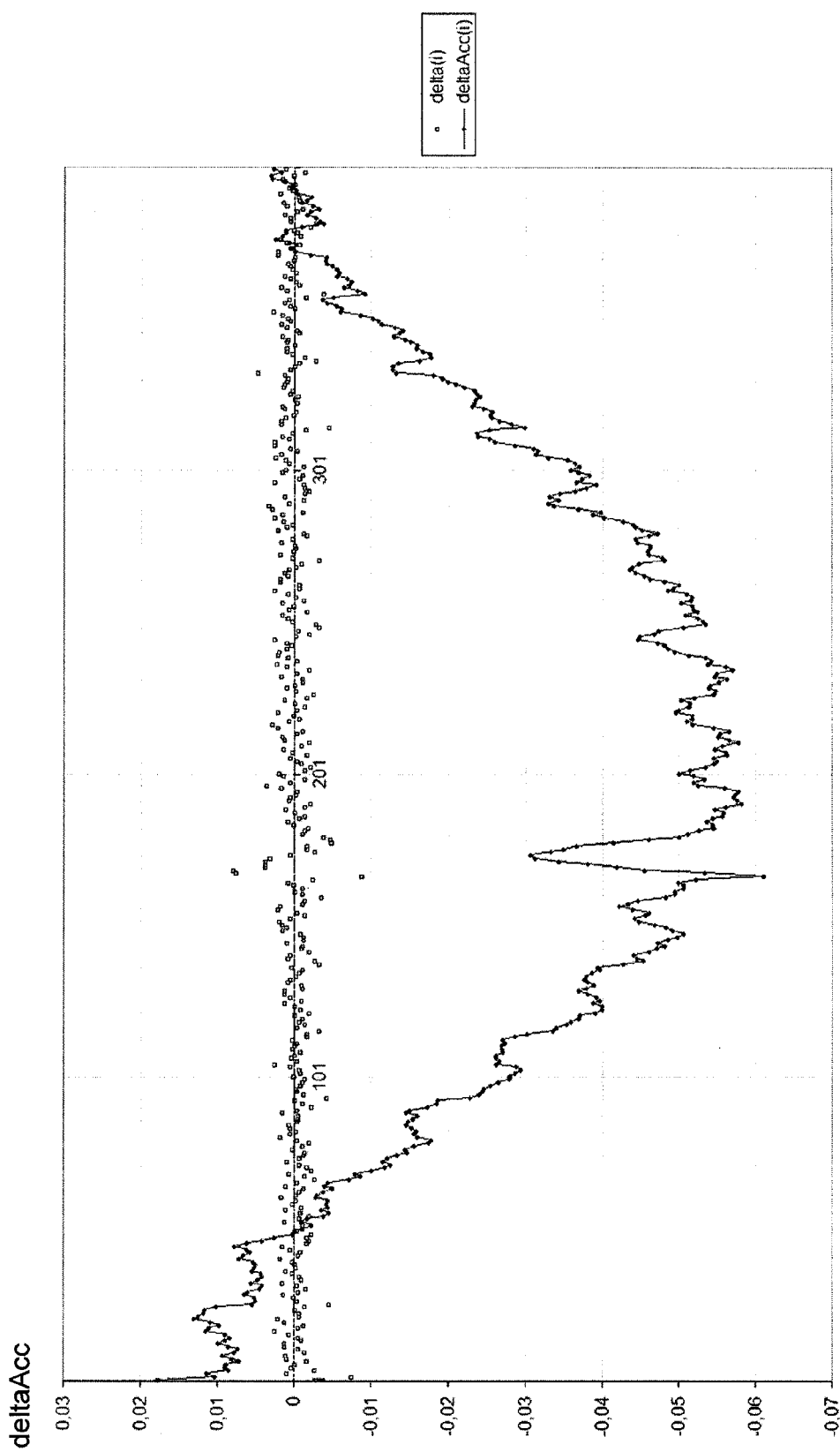
FIG. 3 illustrates the transition from individual errors to accumulated errors.

In a first step 210, in a measuring interval that corresponds, for example, to a rotation of the first gear wheel, a sequence of target angles of rotation of a first gear wheel is set. Here, for example, the drive 110, e.g. a stepper motor, rotates the axis of rotation about a specific angle which can be detected by the sensor 120. Preferably, when using toothed wheels in the gearing system a number of measuring points are used so that a number of measured values are obtained for each tooth. In FIG. 3, which is described in more detail below, 400 measured values are shown for a rotation of approximately 35°. This corresponds to approximately 18 teeth of a large toothed wheel with 189 teeth. Accordingly, for each measuring point a different target angle of rotation is set by the drive 110 and the sensor 120.

In the following step 220 an output angle of rotation of a second gear wheel is measured for each of the target angles of rotation. As described with reference to FIG. 1, the rotation of the first gear wheel 130 also brings about a rotation of the second gear wheel 160. In an ideal arrangement with toothed wheels of identical size and number of teeth, the target angle of rotation would correspond to the output angle of rotation. In a typical gearing system, however, one toothed wheel is generally larger and contains more teeth than the other toothed wheel. This leads to a specific transmission ratio of the gearing system. Thus the target angle of rotation and the output angle of rotation are not identical.

By using at least the transmission ratio of the first gear wheel and the second gear wheel, according to step 230 of FIG. 2, a plurality of theoretical output angles of rotation can be calculated upon the basis of the plurality of target angles of rotation. For an ideal gearing mechanism phiBtheo=phiA*NA/NB applies here, phiBtheo being the theoretical output angle of rotation, phiA being the target angle of rotation, NA being the number of teeth of the first toothed wheel or gear wheel A and NB being the number of teeth of the second toothed wheel B. Since ideal gearing mechanisms do not exist, however, for a real gearing system an error expression, designated here by delta, is introduced, leading to the following equation:

$$phiB=phiA*NA/NB+\text{delta} \quad (1)$$

Delta is the deviation between the theoretical output angle of rotation and the measured angle of rotation, and results from the geometric irregularities of the gear wheels. Since the transmission ratio, namely the number of teeth of the gear wheels, is normally known, the geometric error can be obtained from the angle of rotation differences identified by delta, i.e. the difference between theoretical and measured output angles of rotation phiB, in step 240.

In FIG. 3 400 individual errors delta (i) are shown, for example, which correspond respectively to an angle of rotation difference between a theoretically calculated output angle of rotation and a measured output angle of rotation at 400 different measuring points (see cloud of dots around the abscissa in FIG. 3). In this example the first gear wheel is a large toothed wheel with NA=189 and the second gear wheel is a small toothed wheel with NB=18.

To better evaluate the errors in the gear wheels, i.e. the deviation of the latter from an ideal gear wheel, and an optimal distance determination between the axes of rotation of the gear wheels, the angle of rotation differences are added up.

In detail, as shown by step 250, a sequence of cumulative values deltaAcc is formed which are connected to the angle of rotation differences. A cumulative value which is connected to a present angle of rotation difference includes a total of angle of rotation differences which precede the present angle of rotation difference within the measuring interval. In particular, to form a cumulative value all of the angle of rotation differences, which were previously obtained within the measuring interval, are added up, including the currently obtained angle of rotation difference from the difference between the currently measured output angle of rotation and the theoretically calculated output angle of rotation. For example, for the tenth cumulative value deltaAcc (10), the angle of rotation differences from the first to the tenth measuring point are added up.

In general, an accumulated error is obtained as a cumulative value of each measuring point and is produced from the following equation:

$$\text{deltaAcc}(i)=\text{sum}(\text{delta}(n), n=0\ldots i) \quad (2)$$

Approximately 400 cumulative values, i.e. accumulated (or also cumulated) errors, are shown in FIG. 3. They form a curve that corresponds approximately to a rotation of the small toothed wheel (second gear wheel). This sequence of cumulative values is produced using the angle of rotation differences delta(i) which are shown around the abscissa. The calculation of the theoretical output angles of rotation, the angle of rotation differences and the cumulative values can be implemented, for example, by the calculation unit 190.

The curve illustrated by the sequence of cumulative values in FIG. 3 shows individual peaks on the curve, and this represents components of a higher frequency and is brought about by the teeth in the toothed wheels used in the example. The curve in FIG. 3 shows a section from the curve shown in FIG. 4 which includes 8400 measuring points within the time range.

Figure 4:
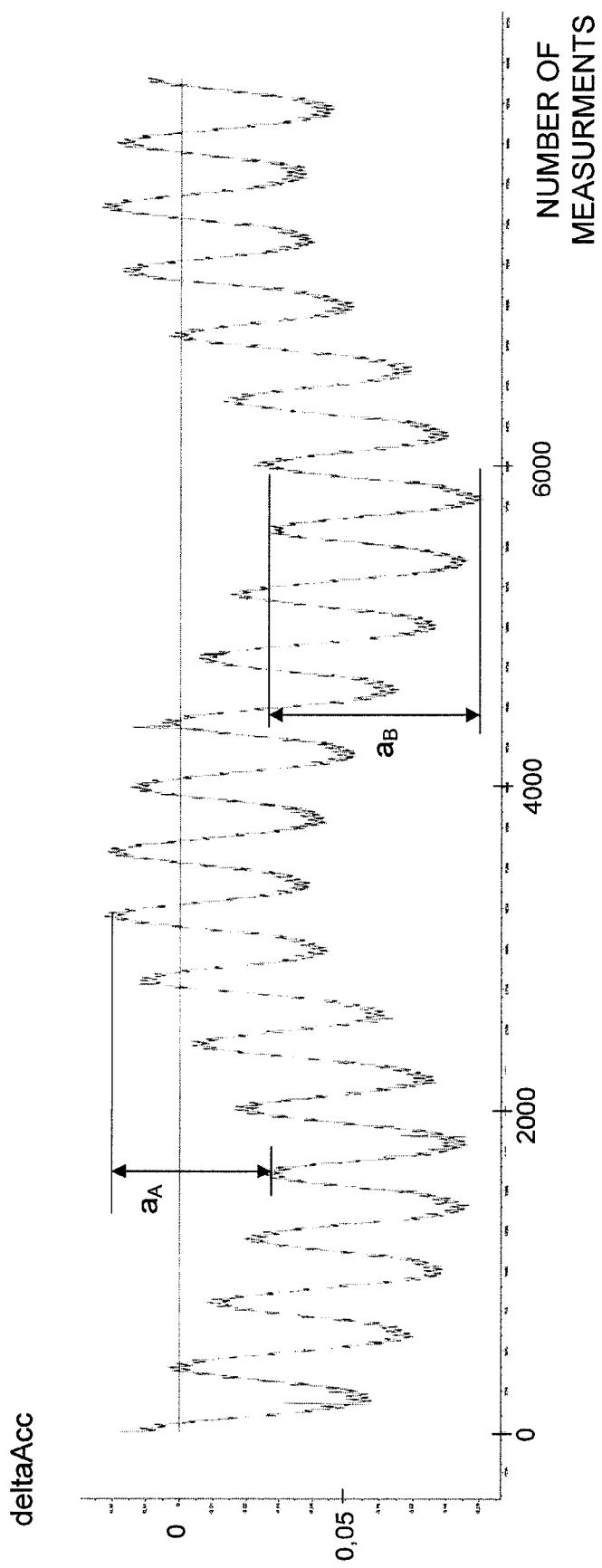
FIG. 4 is a representation of a curve of the accumulated errors for several thousands of measuring points within the time range.

In FIG. 4, 8400 cumulative values for the 8400 measuring points are plotted chronologically one after the other. From the curve shown in FIG. 4 for different cumulative values for the different measuring points, a cosine with low frequency and a cosine with high frequency occur. The cosine oscillation with low frequency is brought about by the eccentricity of the large gear wheel. The cosine oscillation of the high frequency is brought about by the eccentricity of the small gear wheel. The even higher frequencies, which appear as modulations on the cosine oscillations described above, correspond to the teeth of the toothed wheels. These higher frequencies can be seen best in FIG. 3.

The amplitude values and frequencies of the cosine oscillation with low frequency (aA) and the cosine oscillation with high frequency (aB) can be taken directly from FIG. 4. Furthermore, the higher frequencies brought about by the teeth can also be taken from FIG. 3, at least qualitatively. Therefore, simply by using the data from FIGS. 3 and 4, an estimation of the quality of the gearing system and the individual toothed wheels can be made. In particular, in FIGS. 3 and 4 the superimposed cosine oscillations resulting from the eccentricity of the toothed wheels and the effects of the tooth engagements can be easily seen, the higher frequencies, which describe an effect of the tooth engagements, being able to give an indication of the optimal position or the optical distance between the axes of rotation of the gear wheels.

The approximately 8400 measuring points in FIG. 4 were obtained in a measuring interval that includes 800 gon, which corresponds to two rotations of the large toothed wheel, 21 rotations of the small toothed wheel or 378 tooth engagements. A measuring resolution of approx. 22 measuring points per tooth engagement is thus produced.

Accordingly, as described in step 260 of FIG. 2, a first amplitude value of a first frequency component, a second amplitude value of a second frequency component and/or a third amplitude value of a third frequency component can be determined based on the sequence of cumulative values. The first frequency component is produced here by a rotation of the first gear wheel, e.g. gear wheel 130, within the measuring interval, the second frequency component is produced by a rotation of the second gear wheel, e.g. gear wheel 160, within the measuring interval, and the third frequency component is produced by a number of gear wheel tooth engagements between the gear wheel teeth of the first gear wheel and the second gear wheel within the measuring interval.

Determination of the amplitude values can be carried out not only simply by viewing the data, but also in a determination unit which can be embodied in the calculation unit 190. For example, the curve shown in FIG. 4 can also be examined in more detail using a quantitative frequency analysis. An amplitude value, which is connected to the first, second and/or third frequency component can be evaluated, for example, by being compared with previously stored amplitude values, to obtain a quality measure of the gearing system. A similar analysis regarding quality of the gearing system can also be made with gearing systems having more than two gear wheels.

Figure 5:
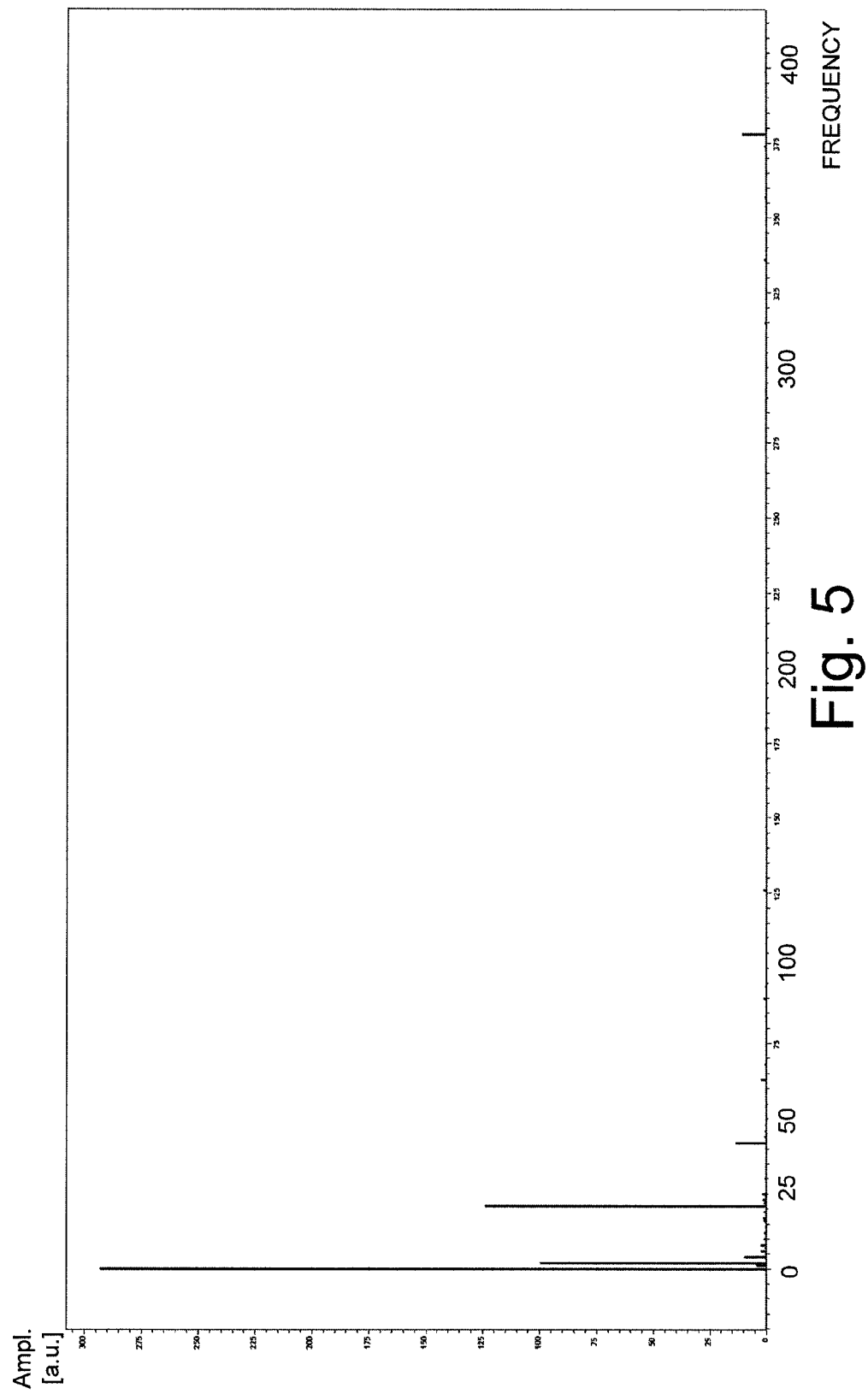
FIG. 5 shows a spectrum of the transformed curve of the accumulated errors shown in FIG. 4 within the frequency range.

As mentioned above, the curve shown in FIG. 4 can be analyzed using qualitative and quantitative frequency analysis. For example, frequency analysis can be made to determine at least one of the amplitude values of the first, second or third frequency component. If a discrete Fourier transformation is applied to the sequence of cumulative values deltaAcc (i) of FIG. 4, a spectrum shown in FIG. 5 is obtained in the frequency range. The frequencies correspond here to the number of rotations of a gear wheel. In the spectrum shown in FIG. 5 the different frequency components of the gearing mechanism can be isolated from one another, and so also their amplitudes. In this way a frequency analysis can be made by transforming the sequence of cumulative values into the frequency range, instead of a previously described graphical analysis of the sequence of cumulative values within the time range.

The spectrum of FIG. 5 of the transformed curve of FIG. 4 clearly shows the frequencies and amplitudes of the frequency components of the toothed wheels and the tooth engagements. As mentioned above, the measuring interval shown in FIG. 4 includes two rotations of the large toothed wheel (fA=2) and 21 rotations of the small toothed wheel (fB=21). These frequencies can be seen clearly on the left-hand side of FIG. 5. The 378 tooth engagements are also visible with the frequency fT=378. The constant component of the series of measurements (f=0) is dependent upon the starting point, and does not affect the evaluation. For the evaluation of the individual toothed wheels, a frequency window can also be set in the spectrum shown to filter out the other frequencies. Furthermore, harmonic portions of the frequencies fA and fB are visible. With the frequency f=4 this is the first-order harmonic of the large toothed wheel, and with the frequency f=42 the first-order harmonic of the small (second) toothed wheel. Furthermore, frequency portions which originate from other mechanical components, e.g. bearings etc., are visible.

Harmonic portions for the tooth engagements can no longer be seen because the latter lie within a range outside of the range shown in FIG. 5. In the example shown, however, harmonics of fT with fT1=756 and fT2=1134 are shown.

Figure 6:
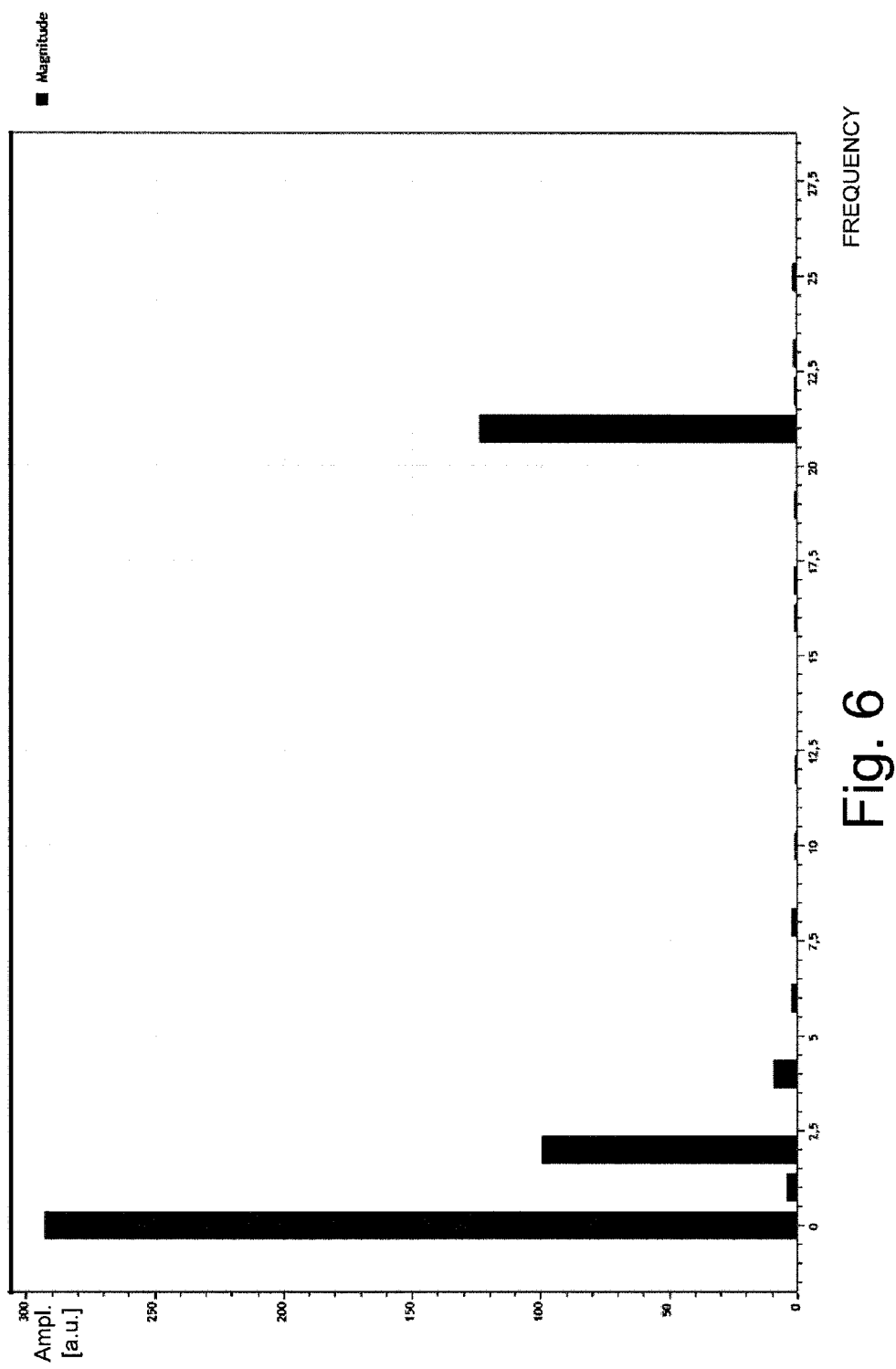
FIG. 6 illustrates an enlarged section of the spectrum of FIG. 5.

FIG. 6 is an enlarged section of the spectrum shown in FIG. 5 showing the frequencies and amplitudes of the toothed wheels. In the spectrum of FIGS. 5 and 6 in the frequency range, the amplitudes can be isolated, the amplitudes of the frequency components shown in FIGS. 5 and 6 being connected to the eccentricity of the toothed wheels and to the effect of the toothed wheel engagements.

After a transformation of the sequence of cumulative values deltaAcc into the frequency range, the individual frequency components can be transformed back into the time range. In particular, the previously determined first frequency component can be transformed back into the time range to obtain a first accumulated or integrated angle of rotation error of the first gear wheel deltaIntA(i). This accumulated angle of rotation error of the first gear wheel deltaIntA(i) is produced by rotating the first gear wheel from an initial position at measuring point 1 to the present, i.e. last obtained, measuring point i. Furthermore, the previously determined second frequency component can be transformed back into the time range in order to obtain a second accumulated or integrated angle of rotation error of the second gear wheel deltaIntB(i) which is produced by rotating the second gear wheel.

By transforming, the following equations (3) and (4) are obtained for the individual gear wheels:

$$\text{deltaInt}A(i)=aA*\cos((2*\Pi*fA)*i/k+pA) \quad (3)$$

$$\text{deltaInt}B(i)=aB*\cos((2*\Pi*fB)*i/k+pB) \quad (4)$$

Here k is the number of measured values for a rotation of the gear wheel A or B. From the comparison of one of these cosine functions with the curve in FIG. 4 the phase value pA or pB of the cosine function also can be obtained. For example, by comparing the cosine function for the large gear wheel with the curve in FIG. 4, the phase at the first measuring point results. The phase values are also produced by the calculation of the Fourier transformation. In the present example in FIG. 4 pA is approximately Π/2.

Furthermore, the frequency component which is produced by the number of gear wheel tooth engagements between the gear wheel teeth of the first gear wheel and the second gear wheel can also be transformed back into the time range in the same way:

$$\text{deltaInt}T(i)=aT*\cos((2*\Pi*fT)*i/k+pT) \quad (5)$$

The phase value pT is also produced from the Fourier transformation described above.

Therefore, by transforming back the isolated values in the frequency range into the time range, a cosine function is determined for each frequency component which describes the individual toothed wheels or toothed wheel engagements.

As described with reference to FIG. 3, the higher frequency portions in FIGS. 3 and 4 represent gear wheel tooth engagements between the gear wheel teeth which do not constitute a clean cosine function. Since the effect of the teeth cannot be described optimally by an individual cosine function, higher-order harmonics of the frequency fT are preferably added to the equation (5). A corresponding progression can be shown as follows:

$$\text{deltaInt}T(i)=aT*\cos((2*\Pi*fT)*i/k+pT)+aT1*\cos((2*\Pi*fT)*2*i/k+pT1)+\ldots+aTn*\cos((2*\Pi*fT)*n*i/k+pTn) \quad (6)$$

Therefore, for each harmonic an amplitude value can be obtained. The amplitude values of the first two harmonics are also obtained by a discrete Fourier transformation. Thus the progression shown in equation (6) can be truncated for practical purposes after the second harmonic.

By derivation from equations (3) and (4), the absolute step angle error can be obtained which shows one error per measuring position. For example, if a stepper motor is used to set the target angle of rotation, the absolute step angle error specifies the error for each step on a toothed wheel.

$$\text{delta}A(i)=aA*(2*\Pi*fA)/k*(-\sin((2*\Pi*fA)*i/k+pA)) \quad (7)$$

$$\text{delta}B(i)=aB*(2*\Pi*fB)/k*(-\sin((2*\Pi*fB)*i/k+pB)) \quad (8)$$

In detail, equation (7) is obtained by forming a derivation from the first accumulated angle of rotation error deltaIntA(i), and equation (8) by forming a derivation from the second accumulated angle of rotation error deltaIntB(i) for the second gear wheel. From equations (7) and (8) the minimum and maximum step angle errors can now be calculated for the large toothed wheel A and the small toothed wheel B which correspond, for example, to the gear wheel 130 and the gear wheel 160.

In this way the radius variations (eccentricities) of the individual gear wheels can be calculated as follows. For gear wheel A the following is produced:

$$\text{delta}rA=rnominalB/phinominalA*(\text{delta}A\text{ErrMax}-\text{delta}A\text{ErrMin}) \quad (9)$$

For gear wheel B the following is produced:

$$\text{delta}rB=rnominalA*phinominalA*((1/(phinominalB+\text{delta}B\text{ErrMax}))-(1/(phinominalB+\text{delta}B\text{ErrMin})) \quad (10)$$

Expressed in words, equation (9) means that a first radius variation deltarA of the first gear wheel is obtained upon the basis of a minimum of the derivation for the first gear wheel and a maximum of the derivation for the first gear wheel, it being possible to calculate the minima and maxima, and rnominal and phinominal being the nominal radius (average radius) and the nominal angle of rotation. In particular, phinominalA is the set target angle of rotation and phinominalB is the theoretical output angle of rotation.

Similarly, equation (10) means that a second radius variation deltarB of the second gear wheel is obtained upon the basis of a minimum of the derivation for the second gear wheel and a maximum of the derivation for the second gear wheel. Therefore, the errors of the gear wheels can be determined not only qualitatively, but quantitatively. Consequently, the gearing system can be optimized by, for example, a very faulty gear wheel being replaced, or the distance between gear wheels being optimized, as described in detail below.

As described above, the harmonics of the third frequency component, i.e. the frequency component which is produced by gear wheel tooth engagements between gear wheel teeth within a measuring interval, can be determined simply by means of a frequency analysis. In particular, the amplitude values of the harmonics of the third frequency component can be obtained, in the present example the frequencies of the first and second harmonic of the frequency component being fT1=756 and fT2=1134. These harmonics constitute a quality measure for the gearing system.

As described in the following with reference to FIG. 7, the amplitude values of the fundamental wave and the harmonics of the third frequency component can be minimized to obtain an optimal distance value between the first axis of rotation of the first gear wheel and the second axis of rotation of the second gear wheel.

Figure 7:
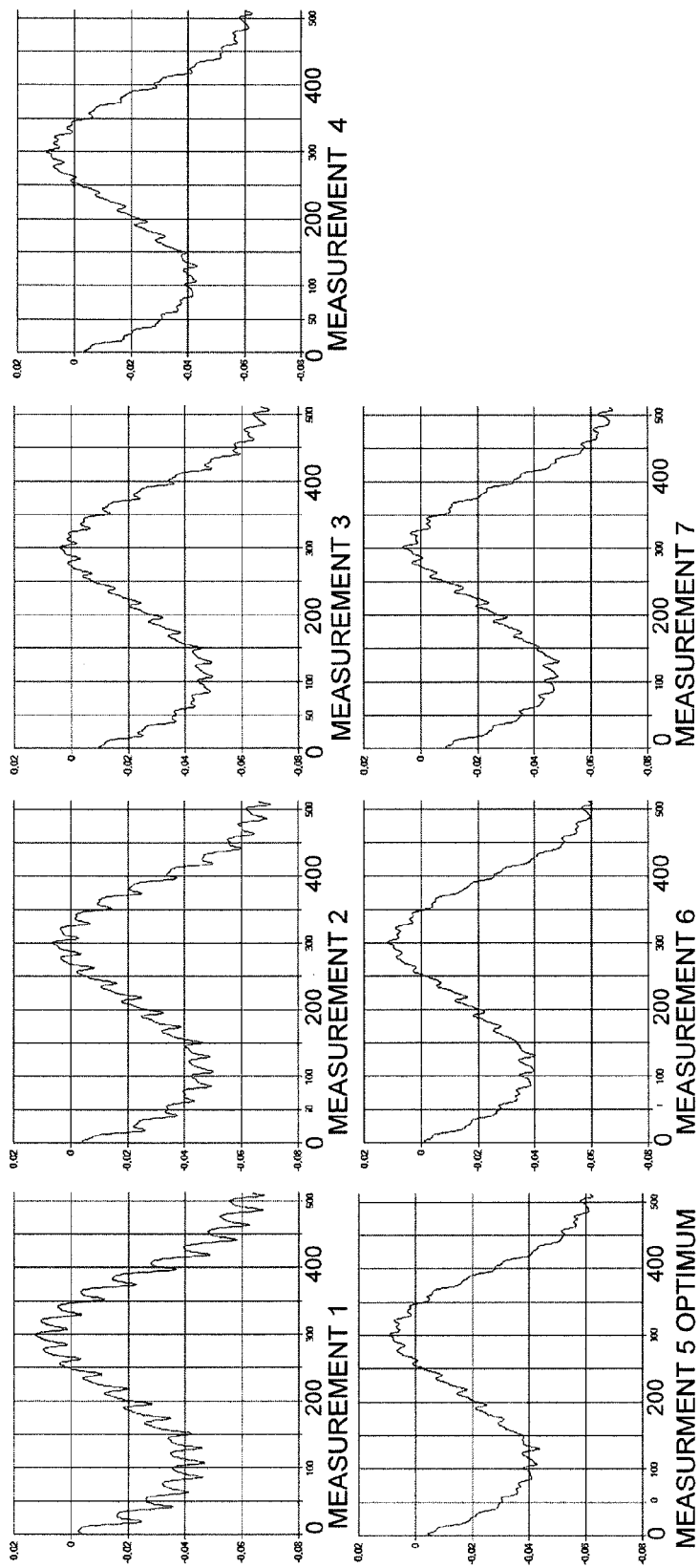
FIG. 7 shows seven measurements of seven different curves of accumulated errors within the time range, the axis distance for each measurement having been varied.

In FIG. 7 seven different sequences of cumulative values deltaAcc for seven different axis distances are shown for approx. 1.2 rotations of a second smaller toothed wheel of a gearing system (approx. 512 measuring points). Such measurements can be taken during adjustment in the production of a gearing system to find an optimum distance for the gear wheels. By considering the different measurements, one can appreciate that higher interfering frequencies on the curve (see high frequency component on cosine oscillation) are the lowest between the fourth and sixth measurement.

Figure 8:
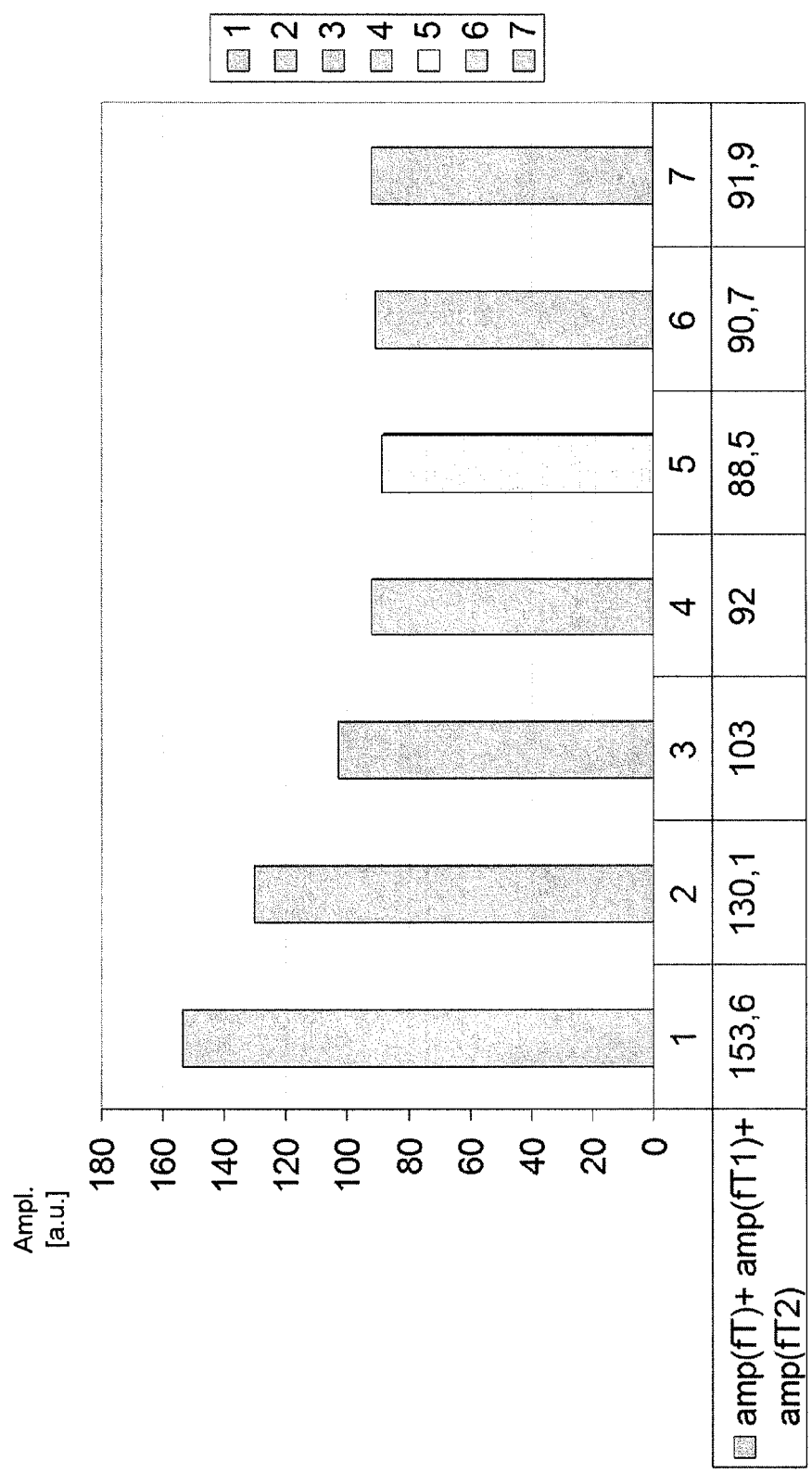
FIG. 8 shows the different amplitude values of measurements 1-7 of FIG. 7.

This result can also be obtained quantitatively. For example, amplitude values of the third frequency component (the fundamental wave and the first and second harmonic) can be obtained for different distance values between the first axis of rotation of the first gear wheel and the second axis of rotation of the second gear wheel. This can be done by means of a frequency analysis, the distance values being changed iteratively to minimize the third frequency component. This type of quantitative analysis is shown in FIG. 8 in which the amplitude is shown in freely chosen units, as also in FIGS. 5 and 6. FIG. 8 shows the total of the amplitudes of the fundamental wave, the first harmonic and the second harmonic for different axis of rotation distance values, it being possible to gather from the figure that a minimum of the total of the three amplitudes is at distance value 5.

In FIG. 8 the total of the amplitudes of the fundamental wave and the first two harmonics has been minimized. However, the amplitude value of at least one of the amplitude value of the third frequency component (fundamental wave) and the amplitude value of the first or second harmonic of the third frequency component can also be minimized by varying the distance between the first axis of rotation and the second axis of rotation in order to reach a conclusion regarding a preferred axis of rotation distance.

In addition to determining the amplitude values, a phase of the frequency component within the frequency range can also be determined, as has been described with reference to FIG. 4 and equations (6) to (8). In particular, it is advantageous to determine the phase difference between a first measuring point and a measuring point i which is connected to a gear wheel of the gear wheels the circumference of which is greater than the circumference of the other gear wheel. The measuring interval can be set optimally by considering the phase. For example, the measuring interval can be set such that it corresponds to two rotations of the large toothed wheel, as described above.

As shown above, by considering the angle of rotation differences described, conclusions can be drawn regarding the quality of a gearing system. Quality parameters for a gearing mechanism or gear wheel include, for example, tooth quality, tooth form, dust, joints, roundness, diameter and axis distance.

The angle of rotation errors obtained can also be used immediately to correct an angle error. More precisely, the cumulative value of the sequence of cumulative values at a specific measuring position, e.g. 200, specifies the deviations with respect to an ideal angle of the second gear wheel which would be obtained with an ideal gearing system with the setting of a target angle of rotation of a first gear wheel which corresponds to the measuring position 200. As such an angle error of the second gear wheel can be corrected using a cumulative value of the sequence of cumulative values which is connected to a target angle of rotation of the first gear wheel.

In the following, in FIGS. 9*a* and 9*b* apparatuses for determining a quality of a gearing system are described. These apparatuses are designed to carry out the steps of the method described above.

Figure 9A:
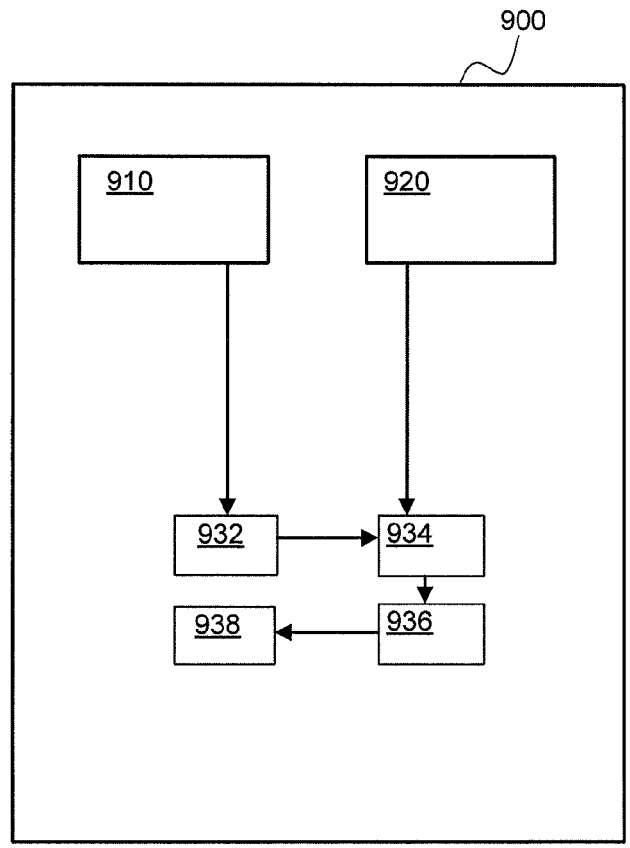
FIG. 9a illustrates elements of an apparatus for determining a quality of a gearing system according to an embodiment of the invention.
Figure 9B:
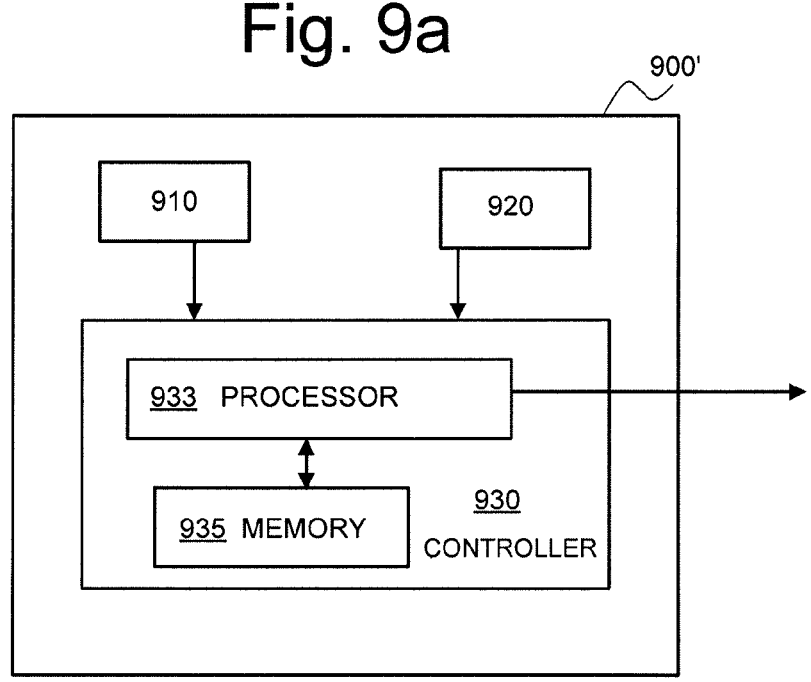
FIG. 9b illustrates elements of an apparatus for determining a quality of a gearing system according to another embodiment.

FIG. 9*a* shows a block diagram of an apparatus 900 for determining a quality of a gearing system. This apparatus can be connected, for example, to a gearing system as shown in FIG. 1 to examine this gearing system. The apparatus 900 includes means 910 for setting, means 920 for measuring, means 932 for calculating, means 934 for obtaining, means 936 for forming and means 938 for determining.

In particular, means 910 are provided for setting within a measuring interval a sequence of target angles of rotation of a first gear wheel. This means, for example, can be in the form of a first sensor or angle encoder, a drive moving an axis of rotation, the rotation of which is measured by the first sensor or angle encoder. By using a stepper motor as a means for setting, the functions of driving and measuring can be realized because a stepper motor can implement rotations in precisely determined steps. As shown in FIG. 1, the means 910 can be directly connected to the gearing system via the first axis of rotation 140 of the first gear wheel 130 in order to construct a test system.

The means 920 is in the form, for example, of a second sensor or angle encoder for measuring for each of the target angles of rotation an output angle of rotation of a second gear wheel, such as e.g. the gear wheel 160. Similarly to the means 910 the means 920 is connected to the axis of rotation 150 of the gear wheel 160 such that the angles of rotation displayed by the gearing system 180 are measured.

The means 932 is for example in the form of a calculation unit, such as calculation unit 190, for calculating a plurality of theoretical output angles of rotation upon the basis of the plurality of target angles of rotation using at least one transmission ratio of the first gear wheel and the second gear wheel. As shown in FIG. 9*a*, the target angles of rotation are delivered from the means 910 to the means 932 to support the calculation of the theoretical output angle of rotation.

The means 934 is used to obtain angle of rotation differences between the plurality of output angles of rotation and the plurality of theoretical output angles of rotation. The means 934 is for example also in the form of a calculation unit and can be integrated into the calculation unit 190. In particular, the means 934 calculates angle of rotation differences using the output angles of rotation measured by the means 920 and the theoretical output angles of rotation calculated by the means 932.

The means 936 is used to form a sequence of cumulative values which are connected to the angle of rotation differences, a cumulative value which is connected to a present angle of rotation difference comprising a total of angle of rotation differences which precede the current angle of rotation difference within the measuring interval, i.e. were already obtained within the measuring interval. In other words, angle of rotation differences for the measuring points preceding the measuring point of the cumulative value and for the corresponding measuring point itself are used when forming the sequence. This sequence of cumulative values was described above with reference to FIGS. 3 and 4.

The means 938 is used to determine at least one amplitude value upon the basis of the sequence of cumulative values and can be also provided, for example, in the form of a calculation unit and in particular be included in the calculation unit 190. The means 938 can determine a first amplitude value of a first frequency component, a second amplitude value of a second frequency component and/or a third amplitude value of a third frequency component.

As already mentioned, the first amplitude value of the first frequency component is produced from a rotation of the first gear wheel within the measuring interval, the second amplitude value of the second frequency component is produced by a rotation of the second gear wheel within the measuring interval, and the third amplitude value of the third frequency component is produced by a number of gear wheel tooth engagements between the gear wheel teeth of the first gear wheel and the second gear wheel within the measuring interval. By using at least one amplitude value which is connected to the first, second or third frequency component, a quality measure of the gearing system can be obtained.

In another embodiment, which is described with reference to FIG. 9b, the functions of the means 932, 934, 936 and 938 are performed by a controller 930 which has a processor 933 and a memory 935. The memory 935 is designed to store a program with instructions, such as e.g. instructions which include at the very least steps 230-260 of FIG. 2, so that the processor 933 executes the steps or functions described above of the means 932, 934, 936 and 938. As also in the apparatus 900 of FIG. 9a means 910 and 920 are provided in the apparatus 900' of FIG. 9b which can convey the target angles of rotation and output angles of rotation to the controller 930.

In the following it is described how an apparatus such as apparatus 900 or 900' can be used to determine the quality of a gearing system of a measuring instrument.

Figure 10:
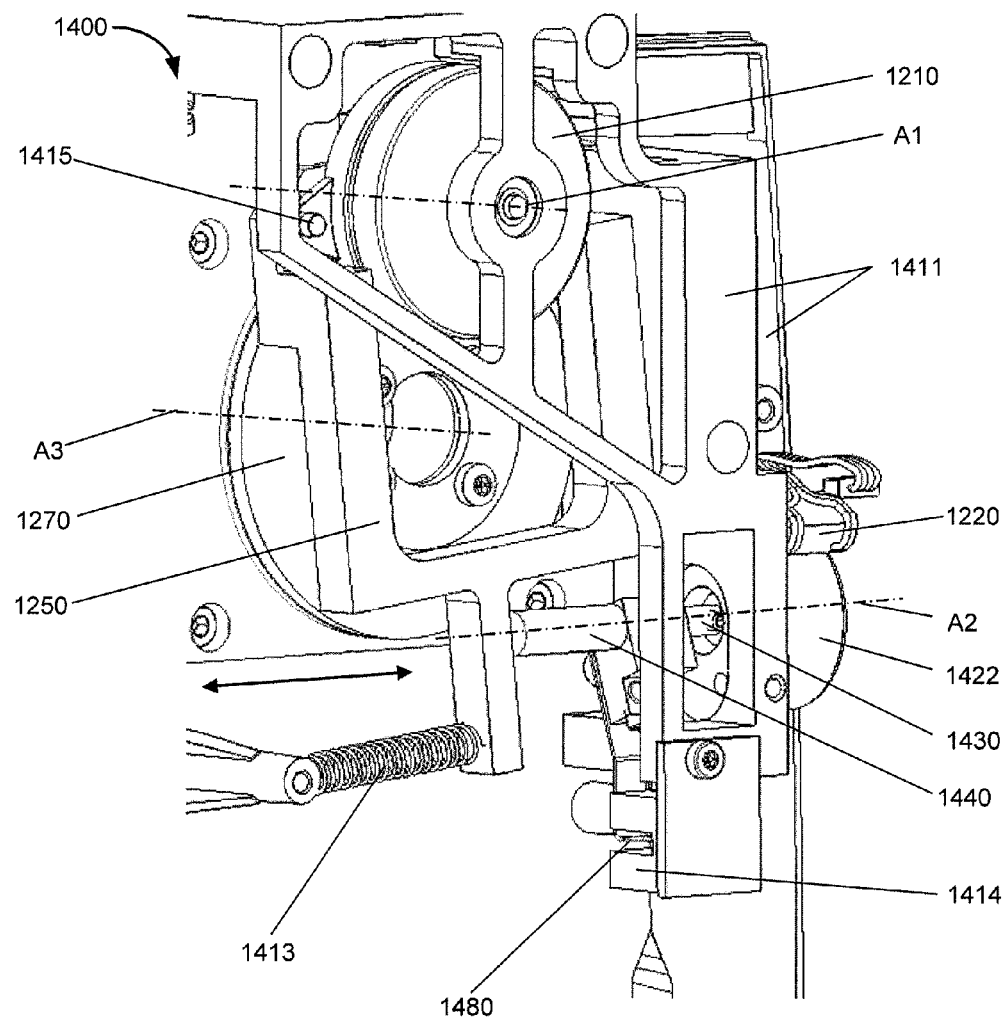
FIG. 10 is a perspective view of a motor drive apparatus with a gearing system.
Figure 11:
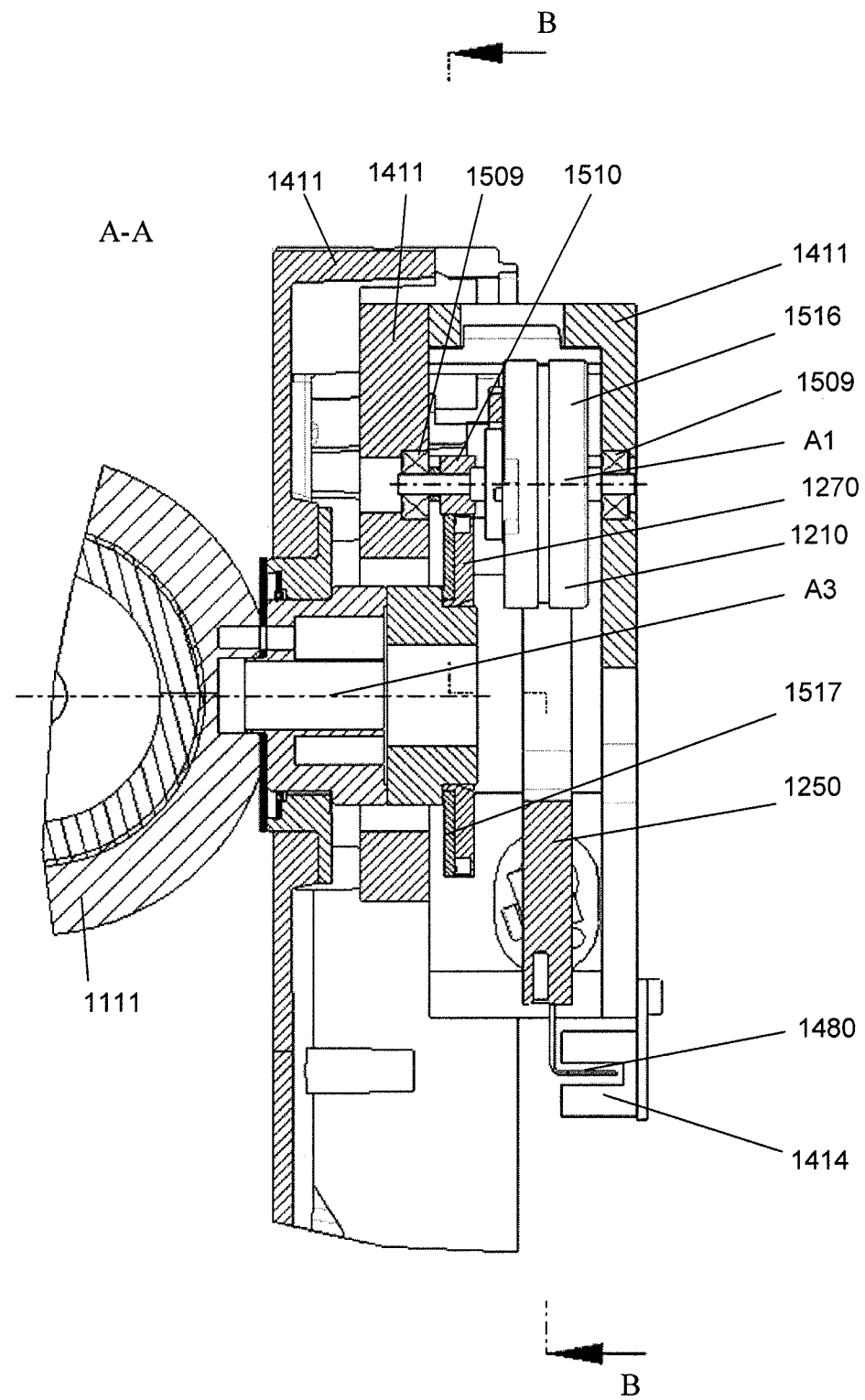
FIG. 11 is a cross-sectional view along a plane parallel to the instrument axis and the axis of rotation of the motor drive apparatus of FIG. 10.
Figure 12:
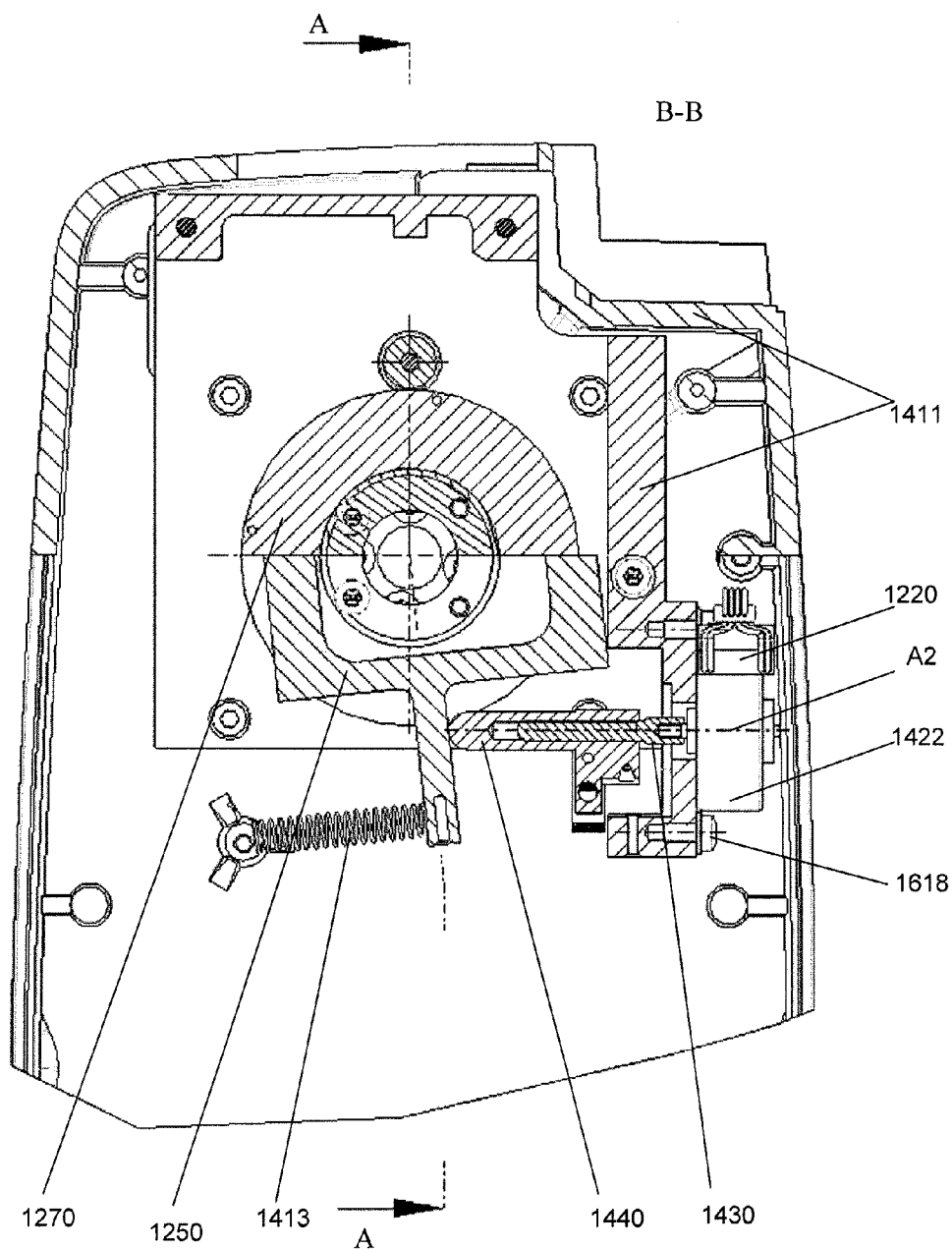
FIG. 12 is a cross-sectional view along a plane at right angles to the instrument axis and the axis of rotation of the motor drive apparatus of FIG. 10.

A motor drive apparatus with a gearing system of a measuring instrument, in particular a surveying instrument, is shown in FIGS. 10, 11 and 12.

FIG. 10 is a detailed perspective view of the motor drive apparatus 1400. The individual elements of the motor drive apparatus, their position in relation to one another, their functions and their interplay are described in detail in German Patent DE 10 2009 000 350 B3 and in US Patent Application 2010 018 0456 A1, which is incorporated by reference herein. Therefore, in the following only a brief explanation of the structure of the motor drive apparatus and the gearing system contained in the latter is given.

In the description of the motor drive apparatus of FIG. 10, reference is made at the same time to FIGS. 11 and 12 which show cross-sectional views of the motor drive apparatus 1400 of FIG. 10 so that the individual elements can be seen from different directions for a better understanding of their positions and functions.

In particular, FIG. 11 shows a cross-sectional view along a plane parallel to the instrument axis A3 and the axis of rotation A1, and FIG. 12 shows a cross-sectional view along a plane at right angles to the instrument axis A3 and the axis of rotation A1 of the motor drive apparatus of FIG. 10.

The motor drive apparatus with the gearing system of FIG. 10 includes a first motor 1210 with an axis of rotation A1, a second motor 1220, a lever arm 1250 and a spur gearing mechanism 270 with the instrument axis A3 which is positioned substantially in the center.

The second motor 1220 essentially causes the lever arm 1250 to move to the left (or to the right) in the figure, as indicated by the lower arrow. When the lower part of the lever arm 1250 is pressed outwards (inwards), i.e. to the left in the figure, the lever arm 1250 rotates about the axis of rotation A1 (in the clockwise direction in the figure). Since the lever arm is attached to a stator of the first motor (see bolt 1415 in FIG. 10), the stator of the first motor 1210 also rotates about the axis of rotation A1.

More precisely, the lever arm 1250 can be coupled to the stator of the first motor 1210 such that a movement of the lever arm is converted into a rotation of the stator. The lever arm can also be mounted rotatably so that it can be rotated about a small angle in relation to the axis of rotation A1. For example the axis of rotation of the lever arm can coincide with the axis of rotation of the first motor, leading to a high transmission ratio for precise rotation of the stator of the first motor by the lever arm.

A stepper motor which provides a holding torque between the rotor and the stator is provided as the motor 1210. Therefore, a rotation of the stator of the first motor 1210 is converted into a rotation of the spur gearing mechanism 1270 that is directly coupled to the rotor of the first motor 1210, or by means of an intermediate spur wheel or another gearing system for rotating the instrument axis by rotating the first motor about the axis of rotation.

The instrument axis A3 in FIG. 10 is shown in principle as a horizontal axis for upwardly and downwardly rotating a part attached to the latter, such as e.g. a head unit 1111 of a measuring instrument, in the vertical direction. The motor drive apparatus 1400 shown can simply be rotated about 90° so that it can also cover the direction at a right angle to this.

The motor drive apparatus shown can be used for rough and fine setting of an instrument axis A3 of a measuring instrument. The individual elements of the apparatus are attached to a frame 1411 of FIG. 10. The instrument axis A3, which is to be rotated, and the rotor axis, which is the axis of rotation A1 of the first motor 1210, are parallel and positioned a predetermined distance apart. The first motor 1210 and the second motor 1220 comprise a stator and a rotor, the rotor being securely connected to the axis of rotation.

As described, as soon as the lever arm 1250 is moved, the stator of the first motor 1210 rotates in the clockwise/anti-clockwise direction. In particular, the instrument axis A3 is driven by the spur gearing mechanism 1270 that is coupled to the rotor of the first motor 1210. The first motor 1210 is rotatably positioned within the frame 1411 so that it can rotate about its own axis of rotation A1. The axis of rotation of the first motor 1210, preferably a stepper motor, is attached to a gear pinion 1510 (see FIG. 11). The gear pinion 1510 can transmit the movement of the rotor of the first motor 1210 to the spur gearing mechanism 1270, and the rotational movement can be transmitted to the instrument axis A3 by the spur gearing mechanism 1270.

The lever arm 1250 is secured to the stator 1516 of the first motor 1210 by screws or bolts 1415, as shown in FIGS. 10 and 11. The other end of the lever arm 1250 is coupled to the second motor 1220 which is also attached to the frame 1411 and is positioned such that its stator 1422 is secure as regards a rotation about the axis of rotation A2 of the second motor 1220.

Coupling between the second motor and the lever arm is achieved in the example of FIGS. 10-12 by a spindle drive which includes a threaded spindle 1430 and a spindle motor 1440. The threaded spindle 1430 is fastened to the rotor axis of the second motor 1220 which is preferably a stepper motor, or can be identical to it, i.e. the motor can be shown in the form of a spindle. By means of the threaded spindle 1430 and the spindle nut 1440 the rotation of the second motor 1220 is converted into a linear movement of the end of the lever arm, namely into a movement to the left or the right in FIG. 10, depending on the direction of rotation.

A spring 1413, which exerts a spring force against the lever arm 1250 in order to press the spindle nut 1440 against the lever arm, is provided in order to reduce play.

In this motor drive apparatus 1400 the first motor 1210 can be used for a rough driving mode in which the instrument axis A3 is rotated at a high angular speed. On the other hand, the accuracy of the positioning of the instrument axis A3, i.e. precise rotation of the instrument axis A3 about a specific angle, is limited by the size of the step positions of the first motor 1210 and the gear transmission ratio which is provided by the spur gearing mechanism around the gear pinion 1510. In order to improve the accuracy of the settings of a measuring instrument the motor drive apparatus 1400 includes the attached stator of the first motor 1210 which can be rotated by the second motor 1220.

In detail, the rotational movement of the second motor 1220 by means of the spindle drive 1430, 1440, the lever arm 1250 and the stator 1516 can be transmitted to the rotor of the first motor 1210 upon the basis of the holding torque between the stator and the rotor of the first motor 1210, and the instrument axis A3 can therefore be rotated finely and precisely. Therefore, fine setting of the instrument axis A3 can be achieved. The fine setting is fundamentally defined by the setting range of the spindle drive 1430, 1440, and the position of the spindle nut 1440 or the lever arm 1250 is constantly monitored by the position detector 1414 and the indicator 1480.

As noted above, FIG. 11 shows a cross-section of the motor drive apparatus 400. The cross-section A-A includes the axis of rotation A1 and the instrument axis A3 which can also be seen in FIG. 12. The first motor 1210 is rotatably attached by means of an appropriate bearing 1509, for example a ball bearing or a slide bearing about the axis of rotation A1 on the frame 1411. The gear pinion 1510 engages in the spur gearing mechanism 1270 and is securely connected to the axis of rotation A1 of the first motor. The spur gearing mechanism 1270 is securely connected to the instrument axis (axis of rotation) A3.

Furthermore, a spur gearing mechanism 1517 can be coupled to the spur gearing mechanism 1270 so that by means of the spring forces, which engage with tangents on the spur wheels in the opposite direction, freedom from play of the spur gearing mechanism can be obtained. Rotation of the instrument axis A3 causes the telescope body (head unit) 1111 to rotate.

On the other hand, FIG. 12 shows a cross-sectional view of the motor drive apparatus 400 along B-B at right angles to the axis of rotation A1 and parallel to the axis of rotation A2. Here the second motor 1220 is attached to the frame 1411 by bolts, including a bolt 1618, so that the stator 422 cannot be rotated about the rotor axis A2 in relation to the frame 1411.

As described with reference to FIGS. 10-12, a number of toothed wheels are used in the motor drive apparatus 1400 as gearing elements to rotate different parts of the motor drive apparatus.

For example, the apparatus 900 or 900' can be attached to the axis of rotation A1 and instrument axis A3 in order to determine the quality of the gearing system which is formed from the gear pinion 1510 and the spur gearing mechanism 1270. In detail, the means 910 is connected here to the axis of rotation A1 and the means 920 to the axis of rotation A3. By means of the steps described with reference to FIG. 2, it can therefore be ascertained whether one of the gear wheels, e.g. a gear pinion or a spur gearing mechanism, has a high degree of eccentricity, or an optimal distance between these gear wheels can be determined by considering the frequency component which is produced by a number of gear wheel tooth engagements between the gear wheel teeth of the gear wheels of the gearing system. Accordingly, target angles of rotation are set on the axis of rotation A1 and output angles of rotation are measured on the axis A3.

Similarly, the gear wheels can also be examined between the axis of rotation A2 and the axis of rotation A1, i.e. in particular the gearing system of the spindle wheel drive comprising the threaded spindle 1430 and the spindle nut 1440. In addition, the quality of the overall gearing mechanism can also be determined in FIG. 10 by means 910 being connected to the axis of rotation A2 and means 920 to the axis of rotation A3, and target angles of rotation being set on the axis of rotation A2 and output angles of rotation being measured on the axis of rotation A3. For example, diagrams as shown in FIGS. 7 and 8 can be obtained if the first gear wheel in FIG. 10 corresponds to the gear pinion 510 and the second gear wheel to the spur gearing mechanism 1270.

The motor drive apparatus described above with the gearing system can be integrated into a measuring instrument in order to rotate an instrument axis of the measuring instrument. Furthermore, if one wishes to rotate the head of a measuring instrument in two directions, namely in a horizontal and a vertical direction, two motor drive apparatuses can be integrated into the measuring instrument so that the first motor drive apparatus can rotate a horizontal instrument axis and the second motor drive apparatus can rotate a vertical instrument axis.

By using the method and the apparatus for determining a quality of a gearing system the accuracy of the angle setting of the motor drive apparatus of the measuring instrument can be increased. In particular, optimal distances for the gear wheels can be found or faulty gear wheels can be identified. Therefore, the inventive concepts described above can simplify and improve quality management during adjustment in the production or maintenance of measuring instruments. As described above, the calculation unit 190 or the controller 930 can be used when controlling and/or calculating and determining the quality.

A processor, such as the processor 933 for example, which issues instructions within a measuring interval to set target angles of rotation and receives measured output angles of rotation, is used as a calculation unit or controller. Furthermore, the processor can execute the functions corresponding to the above procedural steps. In particular, the controller 930 or the calculation unit 190 can be realized by a PC or some other type of computer. Alternatively, the controller or the calculation unit can be realized by a Field Programmable Gate Array (FPGA) or integrated circuit, such as e.g. an ASIC (Application-Specific Integrated Circuit) or software or a suitable combination of the above, but is not restricted to this. Furthermore, as mentioned with reference to FIG. 9b, the controller or the calculation unit includes a memory which can operate in signal communication with the processor.

The function of the controller or the calculation unit can be embodied as a software program and be realized by a processor and a memory such as e.g. a RAM, ROM, hard drive, EEPROM, flash memory, etc. A program code, stored in the memory, can be a program with instructions, designed to cause the processor in the controller to execute the steps and functions described above. In other words, a program can be provided with instructions which are designed to cause a processor, such as e.g. the processor of the controller, to execute combinations of the steps and functions described above.

In addition to this, a computer-readable medium can be provided in which the program is embodied. The computer-readable medium can be concrete, such as e.g. a disk or a data carrier, or may be intangible, displayed by signals which are appropriate for an electronic, optical or other type of transmission. A computer program product can include the computer-readable medium, and if loaded into a program memory of a computer can cause the processor or microprocessor to execute the steps and functions described above.

As described above, the above embodiments and examples make it possible to determine a quality of a gearing system for quality assurance, adjustment and testing in final production and in maintenance as well as error analysis.

It is recognized that different modifications and variations can be implemented in the methods and apparatuses described without straying from the scope or spirit of the invention. The invention has been described with reference to specific embodiments and examples which are provided descriptively and not restrictively. The person skilled in the art will recognize that many different combinations of hardware, software and firmware can be used in order to implement the invention.

In addition to this, other implementations of the invention are apparent to the person skilled in the art in view of the invention disclosed here. It is only intended that the descriptions of the examples be considered as examples. The scope and spirit of the invention are set forth by the following claims.

What is claimed is:

1. A method for determining quality of a gearing system having at least two gear wheels comprising:
    setting within a measuring interval a sequence of target angles of rotation of a first gear wheel;
    measuring for each of the target angles of rotation an output angle of rotation of a second gear wheel;
    calculating a plurality of theoretical output angles of rotation upon the basis of the plurality of target angles of rotation using at least one transmission ratio of the first gear wheel and the second gear wheel;
    obtaining angle of rotation differences between the plurality of output angles of rotation and the plurality of theoretical output angles of rotation;
    forming a sequence of cumulative values which are associated with the angle of rotation differences, a cumulative value, which is associated with a present angle of rotation difference, comprising a total of angle of rotation differences which precede the present angle of rotation difference within the measuring interval;
    determining, based on the sequence of cumulative values, at least one of:
        a first amplitude value of a first frequency component which is produced by a rotation of the first gear wheel within the measuring interval;
        a second amplitude value of a second frequency component which is produced by a rotation of the second gear wheel within the measuring interval; and
        a third amplitude value of a third frequency component which is produced by a number of gear wheel tooth engagements between the gear wheel teeth of the first gear wheel and the second gear wheel within the measuring interval;
    wherein the at least one amplitude value, which is associated with the first, second or third frequency component, constitutes a quality measure of the gear wheel arrangement.

2. The method according to claim 1 further comprising implementing a frequency analysis for determining the at least one amplitude value of the first, second or third frequency component.

3. The method according to claim 2 the frequency analysis including a transformation of the sequence of cumulative values into the frequency range or graphic analysis of the sequence of cumulative values within the time range for determining at least one of the frequency components and the corresponding amplitude of the latter.

4. The method according to claim 3 further comprising
    transforming back the determined first frequency component into the time range for obtaining a first accumulated angle of rotation error which is generated by the first gear wheel; and/or
    transforming back the determined second frequency component into the time range for obtaining a second accumulated angle of rotation error (deltaIntB) which is generated by the second gear wheel.

5. The method according to claim 4 further comprising
    forming a derivation for the first gear wheel from the first accumulated angle of rotation error; and
    forming a derivation for the second gear wheel from the second accumulated angle of rotation error.

6. The method according to claim 5 further comprising
    obtaining a first radius variation of the first gear wheel upon the basis of a minimum of the derivation for the first gear wheel and a maximum of the derivation for the first gear wheel; and/or
    obtaining a second radius variation of the second gear wheel upon the basis of a minimum of the derivation for the second gear wheel and a maximum of the derivation for the second gear wheel.

7. The method according to claim 6 further comprising:
    determining harmonics of the third frequency component, and
    obtaining amplitude values of the harmonics of the third frequency component as a quality measure of the gear wheel arrangement.

8. The method according to claim 7 further including minimizing the amplitude value of at least one of the amplitude value of the third frequency component and the amplitude values of the harmonics of the third frequency component by varying the distance between the first axis of rotation and the second axis of rotation.

9. The method according to claim 8 the measuring interval including at least one rotation of the one gear wheel of the gear wheels the circumference of which is greater.

10. The method according to any of claim 9 including
    in addition to determination of the amplitude values determination of a phase of the frequency component in the frequency range, the phase being connected to the one gear wheel of the gear wheels the circumference of which is greater; and setting the measuring interval upon the basis of the determined phase.

11. The method according to claim 1 further including obtaining amplitude values of the third frequency component for different distance values between the first axis of rotation of the first gear wheel and the second axis of rotation of the second gear wheel and iterative changing of the distance values for minimizing the third frequency component.

12. The method according claim 11 further including correcting an angle error of the second gear wheel using a cumulative value of the sequence of cumulative values which is connected to a target angle of rotation of the first gear wheel.

13. An apparatus for determining a quality of a gear wheel arrangement having at least two gear wheels, comprising:
a first sensor for setting within a measuring interval a sequence of target angles of rotation of a first gear wheel having first gear wheel teeth;
a second sensor for measuring for each of the target angles of rotation an output angle of rotation of a second gear wheel having second gear wheel teeth;
a calculation unit coupled to each of the first sensor and the second sensor for calculating a plurality of theoretical output angles of rotation using the plurality of target angles of rotation and at least one transmission ratio of the first gear wheel and the second gear wheel, and for obtaining angle of rotation differences between the plurality of output angles of rotation and the plurality of theoretical output angles of rotation;
the calculation unit further forming a sequence of cumulative values which are associated with the angle of rotation differences, each cumulative value being associated with a current angle of rotation difference and including a total of angle of rotation difference which precede the present angle of rotation difference within a measuring interval; and
the calculation unit determining, upon the basis of the sequence of cumulative values, at least one of a first amplitude value of a first frequency component which is produced by a rotation of the first gear wheel within the measuring interval, a second amplitude value of a second frequency component which is produced by a rotation of the second gear wheel within the measuring interval, and a third amplitude value of a third frequency component which is produced by a number of gear wheel tooth engagements between the first gear wheel teeth and the second gear wheel teeth within the measuring interval; and the calculation unit computing at least one amplitude value associated with at least one of the first, second, and third frequency component to thereby provide a measure of quality of the gear wheel arrangement.

14. The apparatus of claim 13, wherein the calculation unit implements a frequency analysis for determining the at least one amplitude value of the first, second or third frequency component.

15. The apparatus of claim 14, wherein the frequency analysis includes a transformation of the sequence of cumulative values into the frequency range or graphic analysis of the sequence of cumulative values within the time range for determining at least one of the frequency components and the corresponding amplitude of the latter.

16. The apparatus of claim 15, wherein the calculation unit:
transforms back the determined first frequency component into the time range for obtaining a first accumulated angle of rotation error which is generated by the first gear wheel; and/or
transforms back the determined second frequency component into the time range for obtaining a second accumulated angle of rotation error (deltaIntB) which is generated by the second gear wheel.

17. The apparatus of claim 16, wherein the calculation unit:
forms a derivation for the first gear wheel from the first accumulated angle of rotation error; and
forms a derivation for the second gear wheel from the second accumulated angle of rotation error.

18. The apparatus of claim 17, wherein the calculation unit:
obtains a first radius variation of the first gear wheel upon the basis of a minimum of the derivation for the first gear wheel and a maximum of the derivation for the first gear wheel; and/or
obtains a second radius variation of the second gear wheel upon the basis of a minimum of the derivation for the second gear wheel and a maximum of the derivation for the second gear wheel.

19. The apparatus of claim 18, wherein the calculation unit: determine harmonics of the third frequency component, and
obtain amplitude values of the harmonics of the third frequency component as a quality measure of the gear wheel arrangement.

20. The apparatus of claim 19, wherein the calculation unit further minimizes the amplitude value of at least one of the amplitude value of the third frequency component and the amplitude values of the harmonics of the third frequency component by varying the distance between the first axis of rotation and the second axis of rotation.

* * * * *